(12) United States Patent
P et al.

(10) Patent No.: US 11,799,749 B1
(45) Date of Patent: *Oct. 24, 2023

(54) SYSTEMS AND METHODS FOR FACILITATING TRACEROUTE OPERATIONS ACROSS SEGMENT ROUTING PATHS WITHIN NETWORKS

(71) Applicant: Juniper Networks, Inc., Sunnyvale, CA (US)

(72) Inventors: Arunkumar P, Sunnyvale, CA (US); Deepti Nirmalkumarji Rathi, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,038

(22) Filed: Aug. 31, 2021

Related U.S. Application Data (63) Continuation of application No. 16/661,643, filed on Oct. 23, 2019, now Pat. No. 11,159,410.

(51) Int. Cl.
  *H04L 43/10* (2022.01)
  *H04L 49/00* (2022.01)
  *H04L 45/00* (2022.01)
  *H04L 45/50* (2022.01)

(52) U.S. Cl.
  CPC .............. *H04L 43/10* (2013.01); *H04L 45/34* (2013.01); *H04L 45/50* (2013.01); *H04L 49/3009* (2013.01)

(58) Field of Classification Search
  CPC .......... H04L 43/10; H04L 45/34; H04L 45/50; H04L 49/3009
  See application file for complete search history.

(56) References Cited

U.S. PATENT DOCUMENTS

| | | | |
|---|---|---|---|
| 7,940,695 B1* | 5/2011 | Bahadur | H04L 49/555 370/254 |
| 8,472,346 B1* | 6/2013 | Bahadur | H04L 47/10 370/254 |
| 11,165,695 B1* | 11/2021 | P | H04L 45/28 |
| 2009/0168780 A1* | 7/2009 | Unbehagen | H04L 12/462 370/392 |
| 2010/0309919 A1* | 12/2010 | Filsfils | H04L 45/00 370/395.5 |
| 2014/0198634 A1* | 7/2014 | Kumar | H04L 45/50 370/228 |
| 2019/0158393 A1* | 5/2019 | Nainar | H04L 45/02 |

(Continued)

*Primary Examiner* — Stephen J Clawson
(74) *Attorney, Agent, or Firm* — Greenberg Traurig, LLP (57) ABSTRACT

A disclosed method may include (1) receiving, at a node within a network, an MPLS echo request from an additional node adjacent to the node, (2) determining that a FEC query is included in a FEC stack of the MPLS echo request and then, in response to determining that the FEC query is included in the FEC stack of the MPLS echo request, (3) determining at least one FEC that corresponds to a label included in a label stack of the MPLS echo request, and then (4) notifying the additional node of the FEC that corresponds to the label included in the label stack by sending, to the additional node, an MPLS echo reply that identifies the FEC that corresponds to the label. Various other systems, methods, and computer-readable media are also disclosed.

14 Claims, 8 Drawing Sheets

(56) References Cited

U.S. PATENT DOCUMENTS

2020/0099610 A1* 3/2020 Heron ................... H04L 61/256
2022/0141117 A1* 5/2022 Zhao .................... H04L 45/507
                                                              370/252

* cited by examiner

SYSTEMS AND METHODS FOR FACILITATING TRACEROUTE OPERATIONS ACROSS SEGMENT ROUTING PATHS WITHIN NETWORKS

CROSS REFERENCE TO RELATED APPLICATION

This application is a continuation of U.S. application Ser. No. 16/661,643 filed 23 Oct. 2019, the disclosure of which is incorporated in its entirety by this reference.

BACKGROUND

Traceroute is a network diagnostic command often used to identify and/or display certain segment routing paths included in networks. In addition, traceroute may be used to isolate data plane failures and/or detect whether the data and control planes are out of sync with one another.

In some examples, traceroute may necessitate the Forwarding Equivalence Classes (FECs) that correspond to the labels assigned to segments of a path within a network. One or more of these segments of the path may represent a binding segment that nests and/or stitches tunnels together. For example, a binding segment may include and/or represent a plurality of path segments to which a binding Segment Identifier (SID) label is assigned.

Unfortunately, some nodes within the network may have no direct access to the FECs corresponding to binding SID labels. As a result, those nodes without direct access to such FECs may be unable to conduct and/or perform traceroutes on paths that include binding segments. The instant disclosure, therefore, identifies and addresses a need for additional and improved systems and methods for facilitating traceroute operations across segment routing paths within networks.

SUMMARY

As will be described in greater detail below, the instant disclosure generally relates to systems and methods for facilitating traceroute operations across segment routing paths within networks. In one example, a method for accomplishing such a task may include (1) receiving, at a node within a network, a Multiprotocol Label Switching (MPLS) echo request from an additional node adjacent to the node, (2) determining that a Forwarding Equivalence Class (FEC) query is included in a FEC stack of the MPLS echo request and then, in response to determining that the FEC query is included in the FEC stack of the MPLS echo request, (3) determining at least one FEC that corresponds to a label included in a label stack of the MPLS echo request, and then (4) notifying the additional node of the FEC that corresponds to the label included in the label stack by sending, to the additional node, an MPLS echo reply that identifies the FEC that corresponds to the label.

Similarly, a system that implements the above-identified method may include a physical processor configured to execute various modules stored in memory. In one example, this system may include and/or execute (1) a receiving module that receives, at a node within a network, an MPLS echo request from an additional node adjacent to the node, (2) a determination module that (A) determines that a FEC query is included in a FEC stack of the MPLS echo request and then, in response to determining that the FEC query is included in the FEC stack of the MPLS echo request, (B) determines at least one FEC that corresponds to a label included in a label stack of the MPLS echo request, and (3) a notification module that notifies the additional node of the FEC that corresponds to the label included in the label stack by sending, to the additional node, an MPLS echo reply that identifies the FEC that corresponds to the label.

Additionally or alternatively, a non-transitory computer-readable medium that implements the above-identified method may include one or more computer-executable instructions. When executed by at least one processor of a node within a network, the computer-executable instructions may cause the node to (1) receive an MPLS echo request from an additional node adjacent to the node, (2) determine that a FEC query is included in a FEC stack of the MPLS echo request and then, in response to determining that the FEC query is included in the FEC stack of the MPLS echo request, (3) determine at least one FEC that corresponds to a label included in a label stack of the MPLS echo request, and then (4) notify the additional node of the FEC that corresponds to the label included in the label stack by sending, to the additional node, an MPLS echo reply that identifies the FEC that corresponds to the label.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for facilitating traceroute operations across segment routing paths within networks. As will be explained in greater detail below, the various systems and methods described herein may enable certain nodes within a network to obtain and/or retrieve the FEC information corresponding to binding SID labels even if those nodes do not have direct access to such FEC information. For example, an ingress node may have direct access to the FECs of Interior Gateway Protocol (IGP) labels advertised in connection with a segment routing path. In this example, these FECs of the IGP labels may be stored and/or maintained in a table and/or database onboard the ingress node.

However, the ingress node may have no direct access to a FEC of a binding SID label assigned to a binding segment of the segment routing path. For example, this FEC of the binding SID label may not be stored or maintained in any table or database onboard the ingress node. In this example, the ingress node may query the next hop in the segment routing path for this FEC of the binding SID label via an MPLS echo request. If the binding segment begins at the next hop, the next hop may have direct access to the FEC of the binding SID label. In this case, the next hop may respond to the MPLS echo request with an MPLS echo reply that identifies the FEC of the binding SID label.

After the ingress node receives the MPLS echo reply, the ingress node may identify and/or locate the FEC of the binding SID label within the MPLS echo reply. The ingress node may then apply the FEC of the binding SID label to a subsequent MPLS echo request that is sent across the segment routing path in connection with a traceroute operation. By obtaining the FEC of the binding SID label and then applying the same to a subsequent MPLS echo request in this way, the ingress node may be able to perform and/or conduct a successful traceroute operation on the segment routing path despite the ingress node's inability to directly access the FEC of the binding SID label from any onboard table or database.

Figure 1:
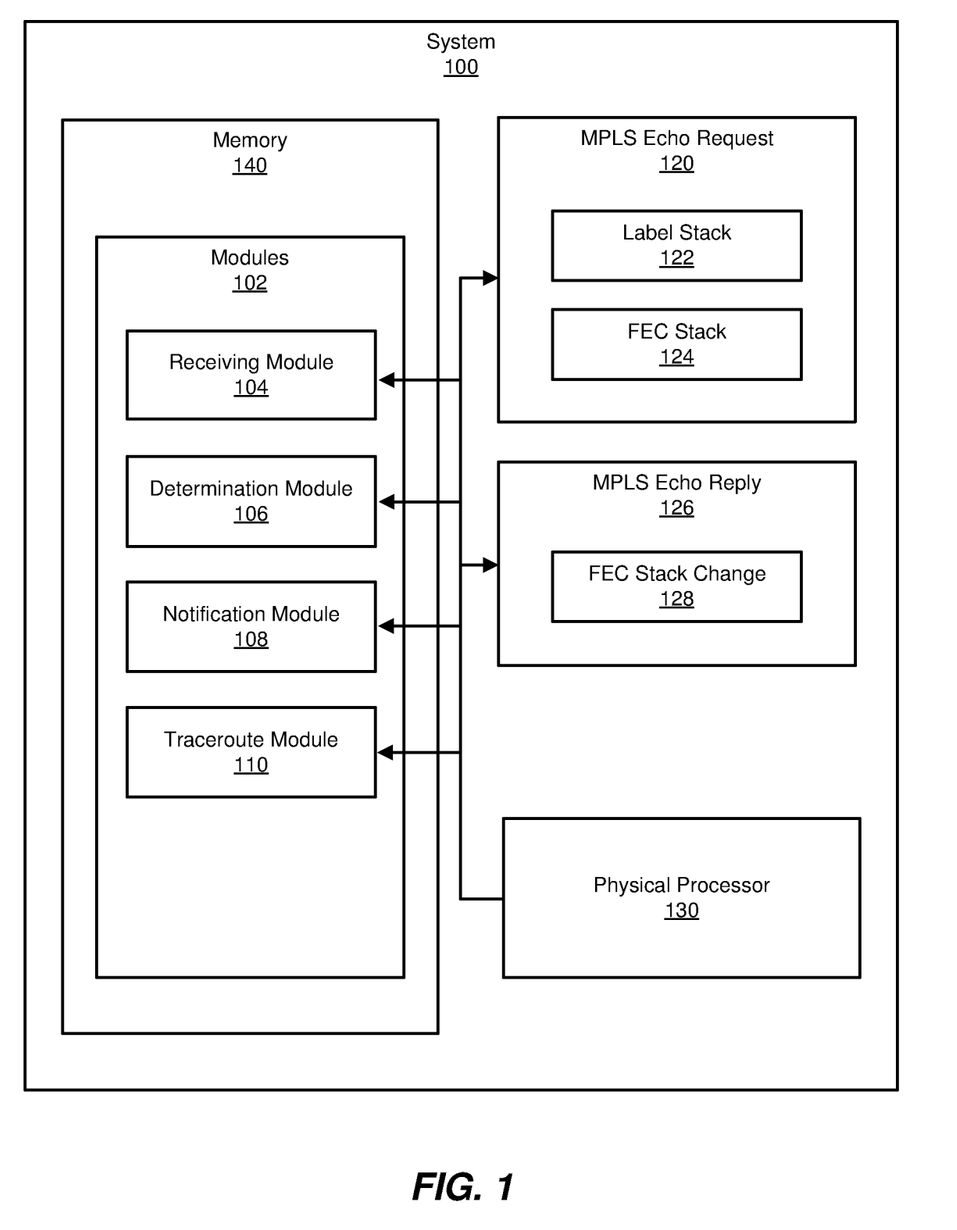
FIG. 1 is a block diagram of an exemplary system for facilitating traceroute operations across segment routing paths within networks.
Figure 2:
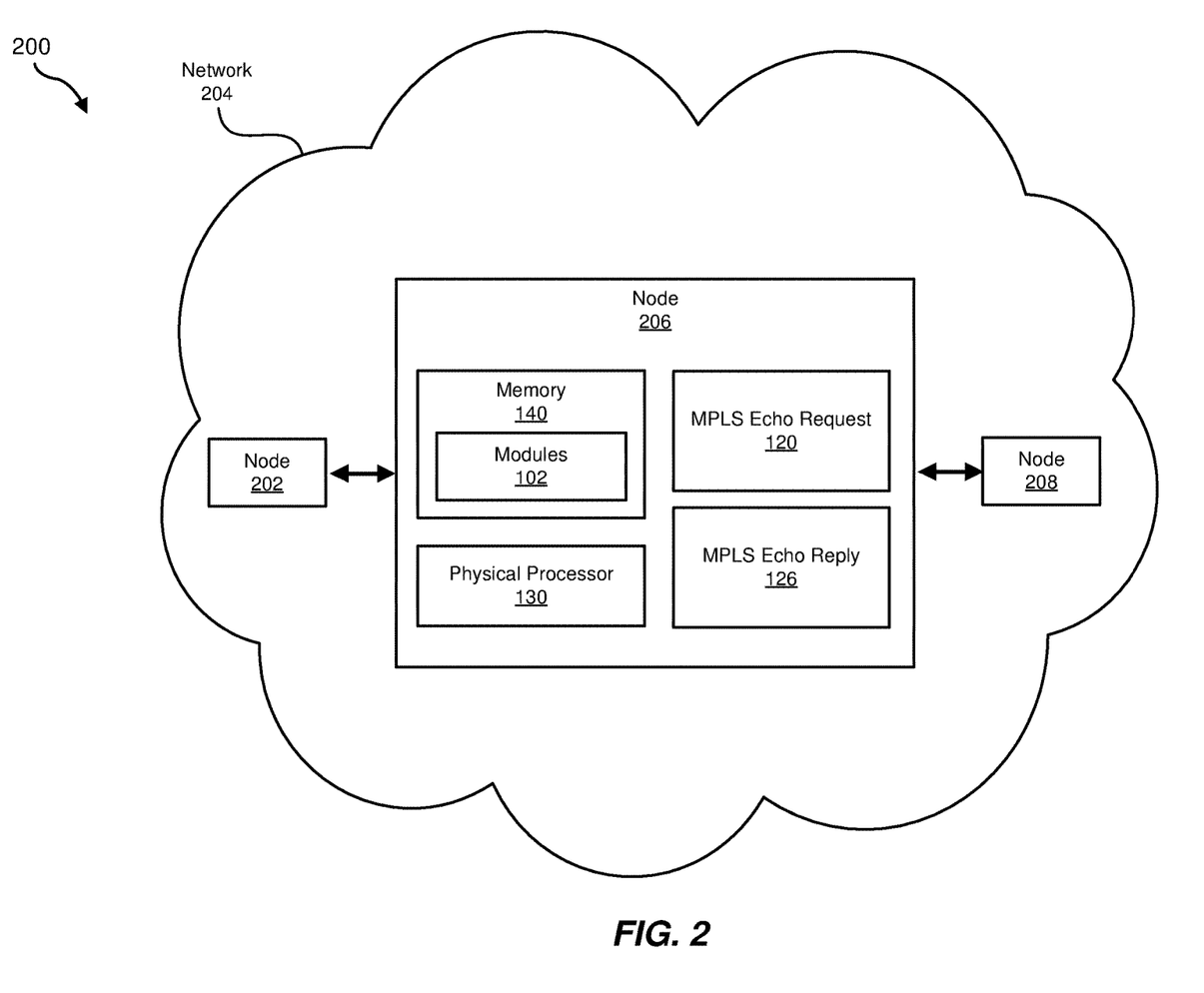
FIG. 2 is a block diagram of an additional exemplary system for facilitating traceroute operations across segment routing paths within networks.
Figure 3:
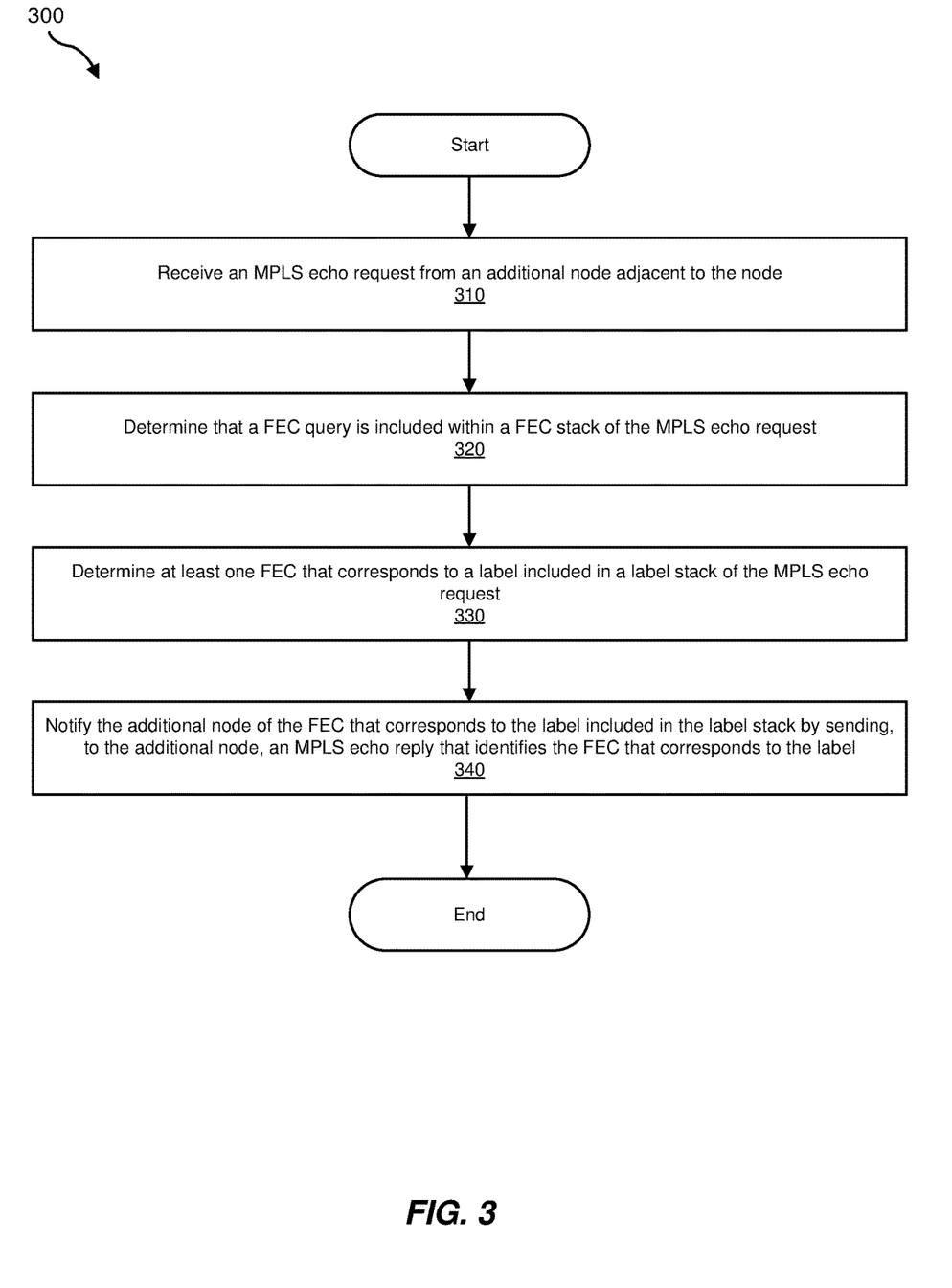
FIG. 3 is a flow diagram of an exemplary method for facilitating traceroute operations across segment routing paths within networks.
Figure 4:
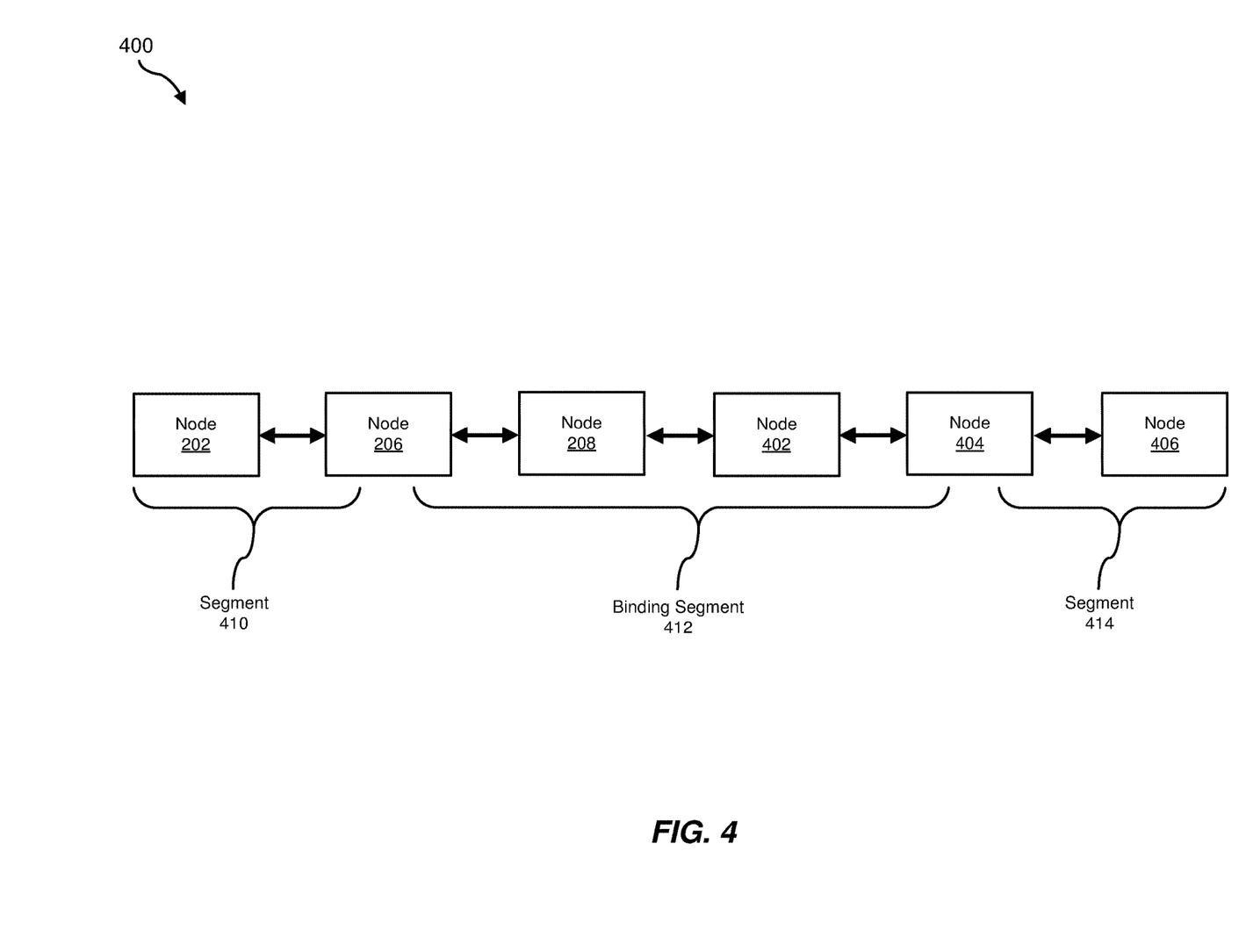
FIG. 4 is a block diagram of an additional exemplary system for facilitating traceroute operations across segment routing paths within networks.

The following will provide, with reference to FIGS. 1, 2, and 4 detailed descriptions of exemplary systems and corresponding implementations for facilitating traceroute operations across segment routing paths within networks. Detailed descriptions of an exemplary MPLS echo request, an exemplary MPLS echo reply, and an exemplary subsequent MPLS echo request will be provided in connection with FIGS. 5, 6, and 7, respectively. Detailed descriptions of computer-implemented methods for facilitating traceroute operations across segment routing paths within networks will be provided in connection with FIG. 3. In addition, detailed descriptions of an exemplary computing system for carrying out these methods will be provided in connection with FIG. 8.

FIG. 1 shows an exemplary system 100 that facilitates facilitating traceroute operations across segment routing paths within networks. As illustrated in FIG. 1, system 100 may include one or more modules 102 for performing one or more tasks. As will be explained in greater detail below, modules 102 may include a receiving module 104, a determination module 106, a notification module 108, and a traceroute module 110. Although illustrated as separate elements, one or more of modules 102 in FIG. 1 may represent portions of a single module, application, and/or operating system. For example, receiving module 104, determination module 106, and/or notification module 108 may represent part of and/or be included in traceroute module 110.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., nodes 202, 206, and/or 208) and/or the devices illustrated in FIG. 4 (e.g., nodes 202, 206, 208, 402, 404, and/or 406). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate facilitating traceroute operations across segment routing paths within networks. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more echo requests, such as MPLS echo request 120. In some examples, MPLS echo request 120 may include and/or represent a label stack 122 and/or a FEC stack 124. In one example, label stack 122 may include and/or represent a set of labels that correspond to and/or identify nodes of a segment routing path within a network. In this example, the set of labels may include labels of any suitable network protocol, such as MPLS labels, IGP labels, Label Distribution Protocol (LDP) labels, Resource Reservation Protocol (RSVP) labels, static labels, etc. Additionally or alternatively, FEC stack 124 may include and/or represent a set of FECs that correspond to and/or describe labels included in label stack 122. In this example, FEC stack 124 may include and/or represent a FEC query that directs and/or causes a receiving node (such as a next hop of an ingress node) to search for and/or respond with the FEC of a certain label included in label stack 122.

In some embodiments, these FECs included in FEC stack 124 may be consistent with the definitions, formats, and/or configurations provided in the Internet Engineering Task Force's (IETF's) RFC 4379, published February of 2006, titled "Detecting Multi-Protocol Label Switched (MPLS) Data Plane Failures," the entire disclosure of which is incorporated herein by reference; the IETF's RFC 6424, published November 2011, titled "Mechanism for Performing Label Switched Path Ping (LSP Ping) over MPLS Tunnels," the entire disclosure of which is incorporated herein by reference; and/or the IETF's RFC 8029, published March 2017, titled "Detecting Multiprotocol Label Switched (MPLS) Data-Plane Failures," the entire disclosure of which is incorporated herein by reference.

As illustrated in FIG. 1, exemplary system 100 may additionally include one or more echo replies, such as MPLS echo reply 126. In some examples, MPLS echo reply 126 may include and/or represent a FEC stack change 128. In one example, FEC stack change 128 may direct and/or cause the ingress node that initiated MPLS echo request 120 to perform one or more tasks in connection with label stack 122 and/or FEC stack 124 or to make one or more modifications to label stack 122 and/or FEC stack 124. For example, FEC stack change 128 may include an instruction to pop the FEC query from FEC stack 124. Additionally or alternatively, FEC stack change 128 may include one or more instructions to push the FECs of labels corresponding to a binding SID.

An apparatus for facilitating traceroute operations across segment routing paths within networks may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among nodes 202, 206, and/or 208.

As illustrated in FIG. 2, network 204 may include and/or represent various network devices and/or nodes that form and/or establish communication paths and/or segments. For example, network 204 may include and/or represent one or more segment routing paths. One of these paths may include and/or represent nodes 202, 206, and/or 208. In this example, node 202 may represent and/or constitute the ingress of the segment routing path, and node 206 may represent and/or constitute the starting point of a binding segment within the segment routing path. Although not illustrated in this way in FIG. 2, network 204 and/or the segment routing path may include and/or represent one or more additional nodes.

In some examples, and as will be described in greater detail below, one or more of modules 102 may cause node 206 to (1) receive MPLS echo request 120 from node 202 adjacent to node 206, (2) determine that a FEC query is included in FEC stack 124 of MPLS echo request 120 and then, in response to determining that the FEC query is included in FEC stack 124 of MPLS echo request 120, (3) determine at least one FEC that corresponds to a label included in label stack 122 of MPLS echo request 120, and then (4) notify node 202 of the FEC that corresponds to the label included in label stack 122 by sending, to node 202, MPLS echo reply 126 that identifies the FEC that corresponds to the label.

Nodes 202, 206, and 208 each generally represent any type or form of physical computing device capable of reading computer-executable instructions and/or handling network traffic. Examples of nodes 202, 206, and 208 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable nodes.

Network 204 generally represents any medium or architecture capable of facilitating communication or data transfer. In some examples, network 204 may include other devices besides nodes 202, 206, and 208 that facilitate communication and/or form part of segment routing paths. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for facilitating traceroute operations across segment routing paths within networks. The steps shown in FIG. 3 may be performed by any suitable computer-executable code and/or computing system, including system 100 in FIG. 1, system 200 in FIG. 2, path 400 in FIG. 4, system 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at a node within a network, an MPLS echo request from an additional node adjacent to the node. For example, receiving module 104 may, as part of node 206 in FIG. 2, receive MPLS echo request 120 from node 202. In one example, node 202 may be situated adjacent to node 206 in a segment routing path of network 204. In this example, node 202 may be the ingress node of the segment routing path, and thus node 202 may have initiated and/or originated MPLS echo request 120. Alternatively, node 202 may be an intermediate node of the segment routing path, and thus node 202 may have received MPLS echo request 120 from the ingress node and/or another intermediate node of the segment routing path.

The systems described herein may perform step 310 in a variety of ways and/or contexts. In some examples, receiving module 104 may monitor node 206 for certain packets and/or requests. While monitoring node 206 for such packets and/or requests, receiving module 104 may detect MPLS echo request 120 upon arrival from node 202. In one example, MPLS echo request 120 may represent part of a traceroute operation initiated by and/or originating from node 202. Additionally or alternatively, MPLS echo request 120 may represent part of a traceroute operation initiated by and/or originating from another node residing opposite of node 206 relative to node 202.

Returning to FIG. 3, at step 320 one or more of the systems described herein may determine that a FEC query is included in a FEC stack of the MPLS echo request. For example, determination module 106 may, as part of node 206 in FIG. 2, determine that a FEC query is included in FEC stack 124 of MPLS echo request 120. In one example, the FEC query may be formatted and/or encoded as a Type Length Value (TLV). Additionally or alternatively, the FEC query may correspond to and/or be associated with a label included in label stack 122 of MPLS echo request 120.

The systems described herein may perform step 320 in a variety of ways and/or contexts. In some examples, determination module 106 may search FEC stack 124 of MPLS echo request 120 for a FEC query. During the search, determination module 106 may identify a FEC query within FEC stack 124 of MPLS echo request 120. In doing so, determination module 106 may determine that FEC stack 124 includes a FEC query.

In one example, the FEC query may indicate that node 202 and/or any preceding nodes included in the segment routing path are unaware of and/or have no knowledge of the FEC corresponding to a specific label included in label stack 122 of MPLS echo request 120. In this example, node 202 and/or any preceding nodes included in the segment routing path may be unaware of and/or have no knowledge of such a FEC because the corresponding label represents a binding segment in the path. In other words, the label to which the FEC corresponds may be a binding SID assigned to that binding segment in the path. This binding SID may correspond to and/or represent multiple segments included in the path.

As will be described in greater detail below, the FEC query may direct and/or cause node 206 to search for and/or identify the FEC that corresponds to and/or is associated with that specific label included in label stack 122 of MPLS echo request 120. Because the binding SID may correspond to and/or represent multiple segments included in the path, the FEC query may result in and/or cause multiple FECs to be returned to node 202 and/or the ingress node in the corresponding MPLS echo reply.

Returning to FIG. 3, at step 330 one or more of the systems described herein may determine at least one FEC that corresponds to a label included in a label stack of the MPLS echo request. For example, determination module 106 may, as part of node 206 in FIG. 2, determine at least one FEC that corresponds to a label included in label stack 122. In this example, determination module 106 may initiate and/or begin this determination process in response to determining that the FEC query is included in FEC stack 124 of MPLS echo request 120. In other words, determination module 106 may determine the FEC(s) in response to the FEC query included in FEC stack 124 of MPLS echo request 120.

In some examples, the FEC may include and/or represent various information related to that label included in label stack 122. Examples of such information include, without limitation, a description of a set of packets to which the label applies, a description of a set of packets with similar or identical characteristics, a description of a set of packets that are forwarded along the same path segment(s), a description of a network protocol associated with the label, combinations or variations of one or more of the same, and/or any other suitable information.

The systems described herein may perform step 330 in a variety of ways and/or contexts. In some examples, determination module 106 may search a certain table onboard node 206 for the FEC that corresponds to the label. During the search, determination module 106 may find and/or identify the FEC that corresponds to the label within the table. Examples of such a table include, without limitation, an MPLS table, a routing table, a forwarding table, an Incoming Label Map (ILM), combinations or variations of one or more of the same, and/or any other suitable table.

Alternatively, during the search, determination module 106 may determine that the table does not include any entry that identifies the FEC(s) corresponding to the label. In response to this determination, notification module 108 may forward MPLS echo request 120 to a node 208 adjacent to node 206 within network 204. If the binding segment begins at node 208, then node 208 may have knowledge and/or information that identifies the FEC corresponding to the label included in label stack 122. In this case, node 208 may obtain and/or retrieve such knowledge and/or information from a certain table onboard node 208 and then return such knowledge and/or information toward node 202 and/or the ingress node in the corresponding MPLS echo reply. For example, node 206 may receive the corresponding MPLS echo reply from node 208 and then pass the same back toward node 202 and/or the ingress node.

However, if the binding segment begins at another node (not illustrated in FIG. 2) subsequent to node 208 within the segment routing path, then node 208 may forward MPLS echo request 120 onward to the subsequent node. This process may recursively continue until MPLS echo request 120 arrives at the node where the binding segment begins (e.g., where the binding segment is nested and/or stitched together). Once the MPLS echo request 120 arrives at the node wherein the binding segment begins, that node may obtain and/or retrieve knowledge and/or information that identifies the FEC corresponding to the label included in label stack 122. Upon doing so, that node may return such knowledge and/or information toward node 202 and/or the ingress node in the corresponding MPLS echo reply. For example, node 206 may eventually receive the corresponding MPLS echo reply from node 208 and then pass the same back toward node 202 and/or the ingress node.

Returning to FIG. 3, at step 340 one or more of the systems described herein may notify the additional node of the FEC that corresponds to the label included in the label stack by sending, to the additional node, an MPLS echo reply that identifies the FEC that corresponds to the label. For example, notification module 108 may, as part of node 206 in FIG. 2, notify the node 202 of the FEC that corresponds to the label included in label stack 122. To do so, notification module 108 may send MPLS echo reply 126 to node 202. In one example, MPLS echo reply 126 may include and/or identify the FEC(s) corresponding to the label included in label stack 122.

The systems described herein may perform step 340 in a variety of ways and/or contexts. In some examples, notification module 108 may generate MPLS echo reply 126 in response to MPLS echo request 120. In one example, notification module 108 may insert FEC stack change 128 into MPLS echo reply 126. In this example, notification module 108 may identify the FEC(s) that corresponds to the label included in label stack 122. Notification module 108 may configure FEC stack change 128 as a pop and/or push operation in MPLS echo reply 126. Accordingly, FEC stack change 128 of MPLS echo reply 126 may direct and/or cause node 202 and/or the ingress node to pop the FEC query from MPLS echo request 120 and/or push the FEC(s) of the path segments onto MPLS echo request 120. Notification module 108 may then forward and/or pass MPLS echo reply 126 to node 202 and/or the ingress node.

Upon receiving MPLS echo reply 126, node 202 and/or the ingress node may initiate and/or perform a traceroute operation using the FEC(s) discovered via MPLS echo reply 126. In one example, the traceroute operation may enable node 202 and/or the ingress node to determine and/or identify each node included in the segment routing path. Additionally or alternatively, the traceroute operation may enable node 202 and/or the ingress node to measure and/or determine certain traffic and/or packet delays experienced along the segment routing path.

FIG. 4 illustrates an exemplary Segment Routing Traffic Engineering (SRTE) path 400 that is included in network 204. As illustrated in FIG. 4, SRTE path 400 may include and/or represent a segment 410, a binding segment 412, and a segment 414. In one example, segment 410 may include and/or represent a link between nodes 202 and 206. In this example, binding segment 412 may include and/or represent a set of links across nodes 206, 208, 402, and 404. In addition, segment 414 may include and/or represent a link between nodes 404 and 406.

Figure 5:
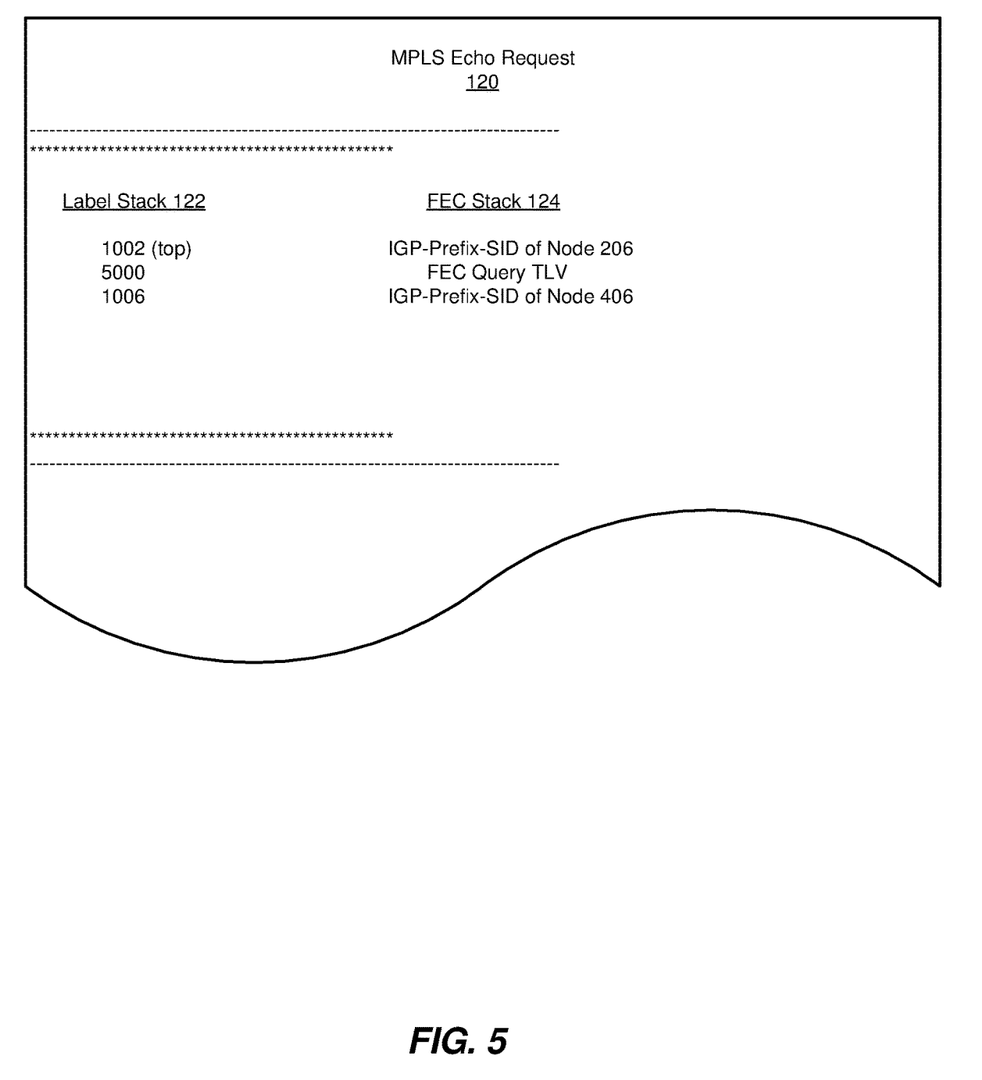
FIG. 5 is an illustration of an exemplary MPLS echo request with a FEC stack that includes a FEC query.

In a specific example, node 202 in FIG. 4 may initiate and/or perform a traceroute operation in connection with SRTE path 400. For example, node 202 may create and/or generate MPLS echo request 120 in FIG. 5. As illustrated in FIG. 5, MPLS echo request 120 may include and/or represent label stack 122 and FEC stack 124. In this example, label stack 122 may include a set of labels (e.g., 1002, 5000, and 1006). In addition, FEC stack 124 may include a set of FECs (e.g., IGP-Prefix-SID of Node 206, FEC Query TLV, and IGP-Prefix-SID of Node 206).

In one example, node 202 may have access to onboard information that identifies the FECs corresponding to labels 1002 and 1006. However, in this example, label 5000 may be a binding SID label assigned to binding segment 412 in SRTE path 400. As a result, node 202 may lack any onboard information that identifies the FEC corresponding to binding SID label 5000. Because node 202 does not have any onboard information about the FEC corresponding to binding SID label 5000, node 202 may be unable to insert the FEC corresponding to binding SID label 5000 in FEC stack 124. Instead of inserting that FEC into FEC stack 124, node 202 may insert a FEC query corresponding to binding SID label 5000 into FEC stack 124.

In one example, node 202 may send MPLS echo request 120 to node 206 along SRTE path 400. Upon receiving MPLS echo request 120, node 206 may determine that FEC stack 124 of MPLS echo request 120 includes the FEC query corresponding to binding SID label 5000. In response to the FEC query corresponding to binding SID label 5000, node 206 may search an onboard MPLS table and/or ILM for the FEC corresponding to binding SID label 5000. During the search, node 206 may find and/or identify IGP labels 5001, 5002, and 5003 in connection with binding SID label 5000 in the MPLS table and/or ILM. In this example, IGP labels 5001, 5002, and 5003 may correspond to and/or represent nodes 208, 402, and 404 included in SRTE path 400.

Figure 6:
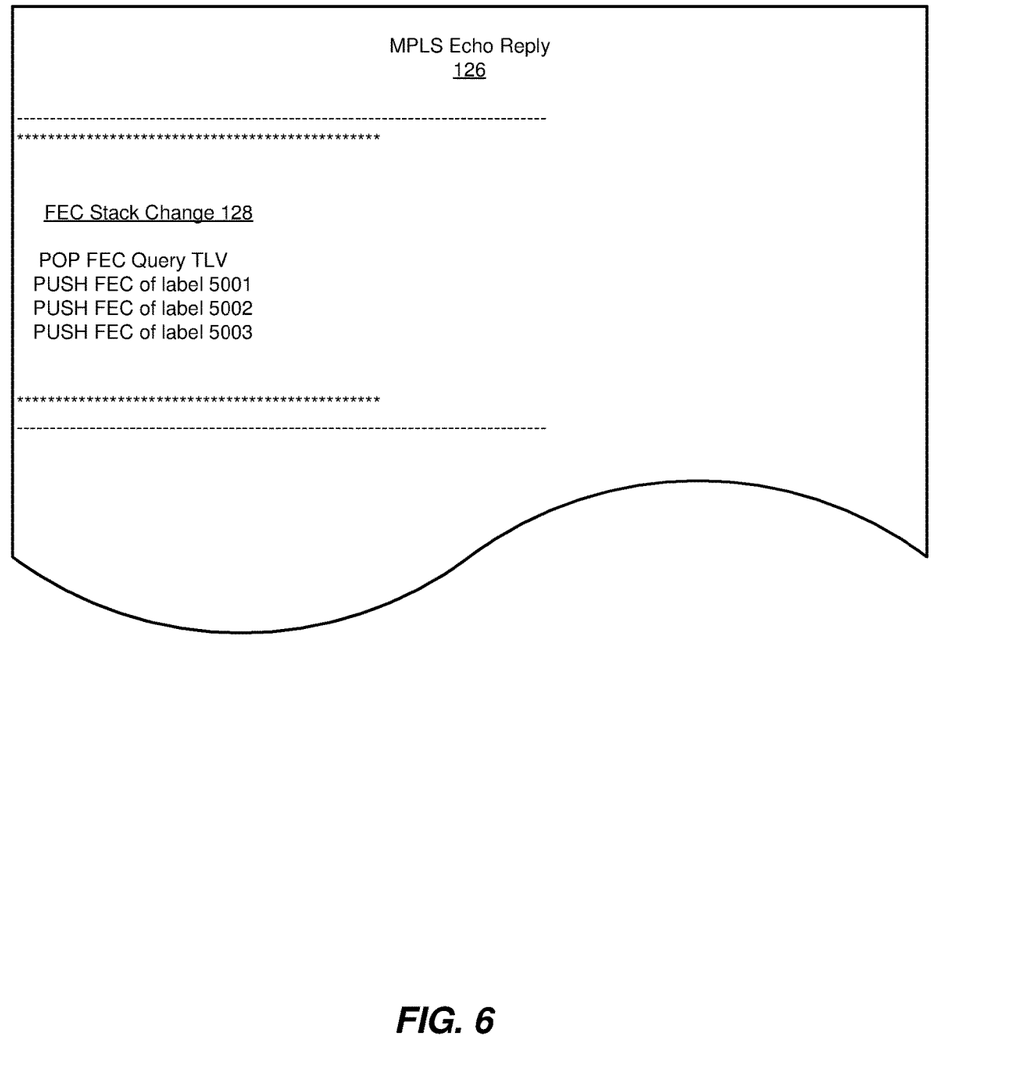
FIG. 6 is an illustration of an exemplary MPLS echo reply with a FEC stack that includes a FEC stack change and a FEC corresponding to a binding SID.

In one example, node 206 may create and/or generate MPLS echo reply 126 in FIG. 6. As illustrated in FIG. 6, MPLS echo reply 126 may include and/or represent FEC stack change 128. In this example, FEC stack change 128 of MPLS echo reply 126 in FIG. 6 may include one or more instructions and/or commands for node 202 in connection with MPLS echo request 120. Specifically, MPLS echo reply 126 in FIG. 6 may include an instruction for node 202 to pop the FEC query from MPLS echo request 120 as well as instructions to push the FECs corresponding to IGP labels 5001, 5002, and 5003 onto MPLS echo request 120. Node 206 may then send MPLS echo reply 126 to node 202 in response to and/or in connection with MPLS echo request 120.

Figure 7:
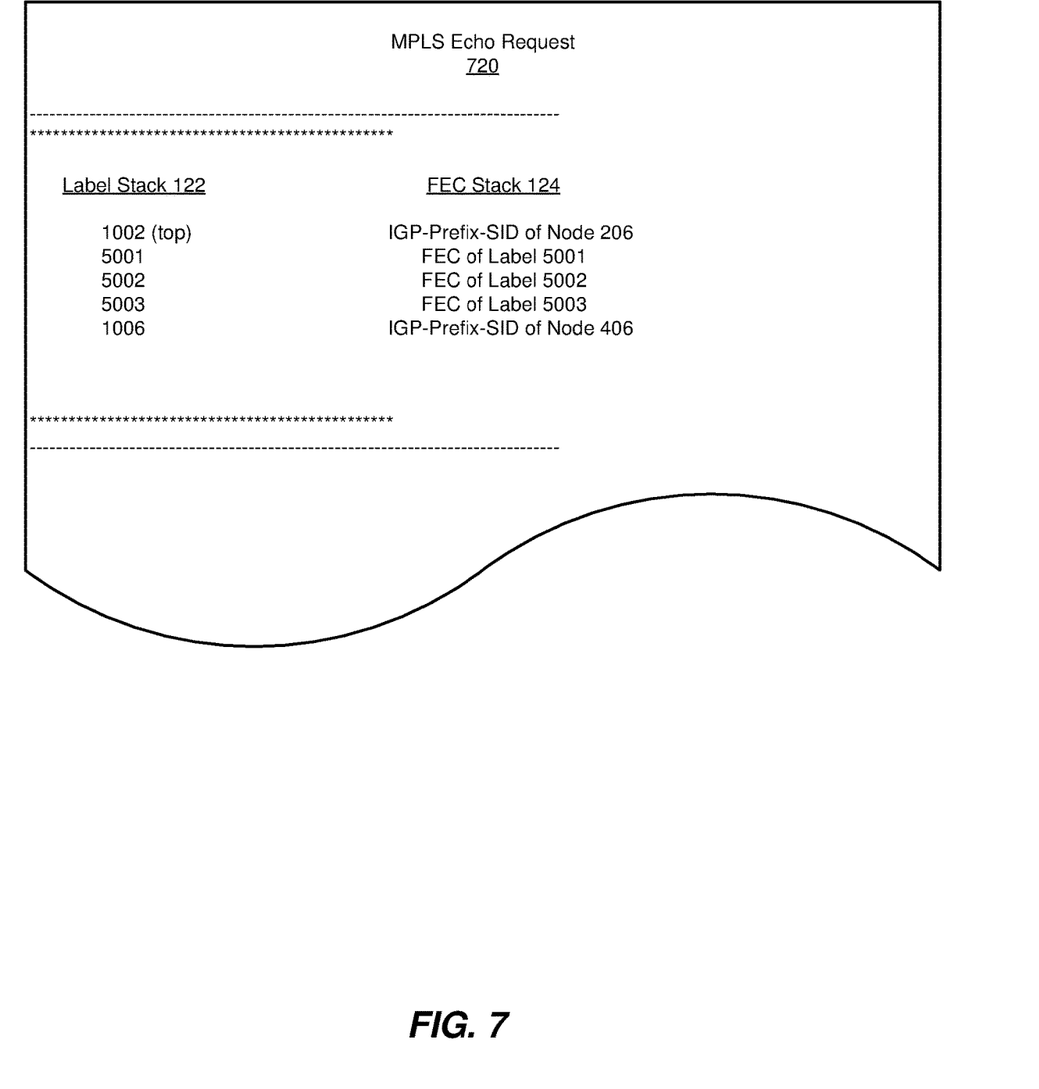
FIG. 7 is an illustration of a subsequent exemplary MPLS echo request that identifies underlying protocol labels of a binding SID with a FEC stack that includes the FECs of the underlying protocol labels.

Upon receiving MPLS echo reply 126 from node 206, node 202 may process FEC stack change 128 to account for the FECs discovered from node 206. Node 202 may then continue the traceroute operation by issuing a subsequent MPLS echo request that incorporates those FECs. For example, node 202 may send an MPLS echo request 720 in FIG. 7 to node 206 in furtherance of the traceroute operation. As illustrated in FIG. 7, MPLS echo request 720 may include and/or represent label stack 122 and FEC stack 124. In this example, label stack 122 may include a set of IGP labels (e.g., 1002, 5001, 5002, 5003, and 1006). In addition, FEC stack 124 may include a set of FECs (e.g., IGP-Prefix-SID of Node 206, FEC of Label 5001, FEC of Label 5002, FEC of Label 5003, and IGP-Prefix-SID of Node 206).

In one example, MPLS echo request 720 may continue along SRTE path 400 until reaching node 406. In response to MPLS echo request 720, node 406 may return another MPLS echo reply that identifies each of nodes 206, 208, 402, 404, and 406 to node 202 via SRTE path 400. Upon receiving that other MPLS echo reply, node 202 may effectively complete the traceroute operation. Accordingly, node 202 may be able to determine and/or know the identities of the nodes included in SRTE path 400.

Figure 8:
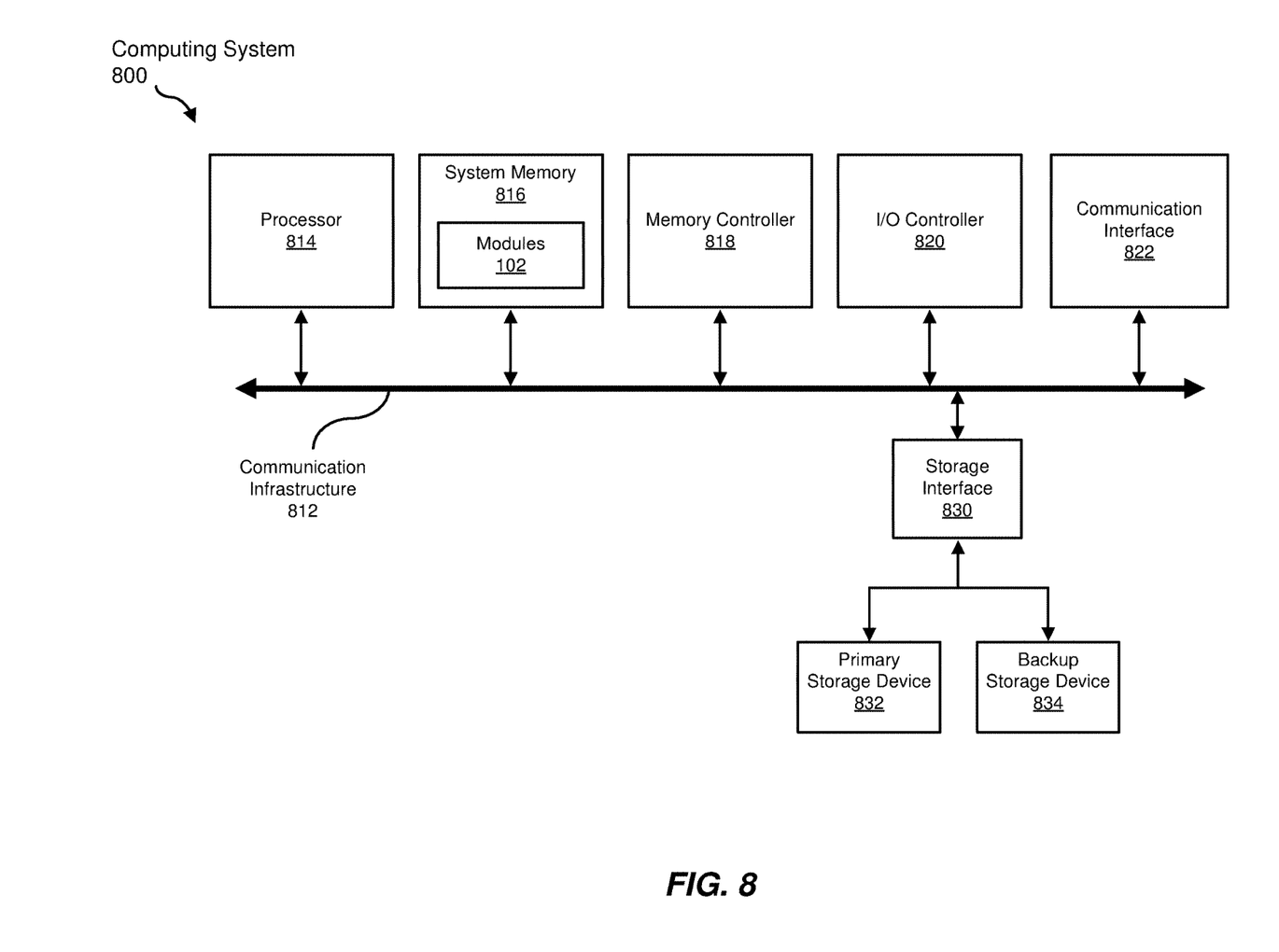
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a node included in a binding segment of a segment routing path within a network, a Multiprotocol Label Switching (MPLS) echo request from an additional node adjacent to the node;
   determining that a Forwarding Equivalence Class (FEC) query is included in a FEC stack of the MPLS echo request, wherein the FEC query causes the node to search for at least one FEC that corresponds to a label included in a label stack of the MPLS echo request; and
   in response to determining that the FEC query is included in the FEC stack of the MPLS echo request:
      searching an MPLS table on the node for the FEC;
      determining, based at least in part on the search, that the MPLS table does not include an entry that identifies the FEC;
      in response to determining that the MPLS table does not include the entry that identifies the FEC, forwarding the MPLS echo request to a subsequent node adjacent to the node;
      receiving an MPLS echo reply to the MPLS echo request from the subsequent node adjacent, wherein the MPLS echo reply includes the FEC; and
      notifying the additional node of the FEC by sending the MPLS echo reply to the additional node.

2. The method of claim 1, wherein the label included in the label stack comprises a binding segment identifier label.

3. The method of claim 1, wherein identifying the FEC that corresponds to the label comprises:
   searching an MPLS table on the node included in the binding segment for the FEC that corresponds to the label; and
   during the search of the MPLS table, finding the FEC that corresponds to the label.

4. The method of claim 1, wherein notifying the additional node of the FEC that corresponds to the label included in the label stack comprises inserting, into the MPLS echo reply, a FEC stack change that identifies the FEC that corresponds to the label included in the label stack.

5. The method of claim 4, wherein inserting the FEC stack change into the MPLS echo reply comprises configuring, in the MPLS echo reply, the FEC stack change as a push operation.

6. The method of claim 1, wherein the FEC comprises information that identifies a network protocol associated with the label included in the label stack.

7. The method of claim 1, further comprising performing a traceroute operation that traces a segment routing path that includes the node and the additional node based at least in part on the FEC identified in the MPLS echo reply.

8. A system comprising:
a receiving module, stored in memory, that receives, at a node included in a binding segment of a segment routing path within a network, a Multiprotocol Label Switching (MPLS) echo request from an additional node adjacent to the node;
a determination module, stored in memory, that:
determines that a Forwarding Equivalence Class (FEC) query is included in a FEC stack of the MPLS echo request, wherein the FEC query causes the node to search for at least one FEC that corresponds to a label included in a label stack of the MPLS echo request;
searches an MPLS table on the node for the FEC;
determines, based at least in part on the search, that the MPLS table does not include an entry that identifies the FEC;
forwards the MPLS echo request to a subsequent node adjacent to the node in response to determining that the MPLS table does not include the entry that identifies the FEC; and
receives an MPLS echo reply to the MPLS echo request from the subsequent node adjacent, wherein the MPLS echo reply includes the FEC;
a notification module, stored in memory, that notifies the additional node of the FEC by sending the MPLS echo reply to the additional node; and
at least one physical processing device configured to execute the receiving module, the determination module, and the notification module.

9. The system of claim 8, wherein the label included in the label stack comprises a binding segment identifier label.

10. The system of claim 8, wherein, to identify the FEC that corresponds to the label, the determination module:
searches an MPLS table on the node included in the binding segment for the FEC that corresponds to the label; and
during the search of the MPLS table, finds the FEC that corresponds to the label.

11. The system of claim 8, wherein, to notify the additional node of the FEC that corresponds to the label included in the label stack, the notification module inserts, into the MPLS echo reply, a FEC stack change that identifies the FEC that corresponds to the label included in the label stack.

12. The system of claim 11, wherein the notification module configures, in the MPLS echo reply, the FEC stack change as a push operation.

13. The system of claim 8, wherein the FEC comprises information that identifies a network protocol associated with the label included in the label stack.

14. A non-transitory computer-readable medium comprising one or more computer-executable instructions that, when executed by at least one processor of a node included in a binding segment of a segment routing path within a network, cause the node to:
receive a Multiprotocol Label Switching (MPLS) echo request from an additional node adjacent to the node;
determine that a Forwarding Equivalence Class (FEC) query is included in a FEC stack of the MPLS echo request, wherein the FEC query causes the node to search for at least one FEC that corresponds to a label included in a label stack of the MPLS echo request; and
in response to determining that the FEC query is included in the FEC stack of the MPLS echo request:
search an MPLS table on the node for the FEC;
determine, based at least in part on the search, that the MPLS table does not include an entry that identifies the FEC;
forward the MPLS echo request to a subsequent node adjacent to the node in response to determining that the MPLS table does not include the entry that identifies the FEC:
receive an MPLS echo reply to the MPLS echo request from the subsequent node adjacent, wherein the MPLS echo reply includes the FEC; and
notify the additional node of the FEC by sending the MPLS echo reply to the additional node.

\* \* \* \* \*